(12) United States Patent
Kokubo et al.

(10) Patent No.: US 11,301,701 B2
(45) Date of Patent: Apr. 12, 2022

(54) SPECIFIC AREA DETECTION DEVICE

(71) Applicant: AISIN CORPORATION, Kariya (JP)

(72) Inventors: Yoshihito Kokubo, Kariya (JP);
Yoshihisa Suetsugu, Kariya (JP); Jun Adachi, Kariya (JP); Hiroyuki Watanabe, Kariya (JP); Koki Ueda, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/939,347

(22) Filed: Jul. 27, 2020

(65) Prior Publication Data
US 2021/0042541 A1 Feb. 11, 2021

(30) Foreign Application Priority Data
Aug. 7, 2019 (JP) .............................. JP2019-145692

(51) Int. Cl.
| | |
|---|---|
| *G06K 9/00* | (2006.01) |
| *G06K 9/50* | (2006.01) |
| *G06K 9/62* | (2006.01) |
| *G08G 1/01* | (2006.01) |
| *G08G 1/14* | (2006.01) |
| *G08G 1/16* | (2006.01) |

(52) U.S. Cl.
CPC ........... *G06K 9/00812* (2013.01); *G06K 9/50* (2013.01); *G06K 9/6256* (2013.01)

(58) Field of Classification Search
None
See application file for complete search history.

(56) References Cited

U.S. PATENT DOCUMENTS

| | | | | |
|---|---|---|---|---|
| 10,867,192 | B1* | 12/2020 | Song | ................... H04N 5/2253 |
| 2006/0167633 | A1* | 7/2006 | Satonaka | ............... G08G 1/168 |
| | | | | 701/300 |
| 2017/0096167 | A1* | 4/2017 | Yoon | ................... B62D 15/028 |
| 2018/0322349 | A1 | 11/2018 | Hayakawa | |
| 2019/0370572 | A1* | 12/2019 | Nagpal | .................... G06T 7/62 |
| 2019/0392229 | A1* | 12/2019 | Yamamoto | ............. G08G 1/168 |

(Continued)

FOREIGN PATENT DOCUMENTS

| | | | |
|---|---|---|---|
| JP | 5786833 B2 | 9/2015 | |
| WO | 2017/068701 A1 | 4/2017 | |
| WO | WO-2017068701 A * | 4/2017 | ......... G06K 9/00825 |

OTHER PUBLICATIONS

Guo et al., "Robust Road Detection and Tracking in Challenging Scenarios Based on Markov Random Fields With Unsupervised Learning," IEEE Transactions on Intelligent Transportation Systems, vol. 13, No. 3, Sep. 2012 (Year: 2012).*

*Primary Examiner* — Soo Shin
(74) *Attorney, Agent, or Firm* — Sughrue Mion, PLLC

(57) ABSTRACT

A specific area detection device that detects a specific area in an imaging area based on a captured image includes: an estimation unit configured to estimate a plurality of points and a direction of a straight line connecting two predetermined points among the plurality of points from a captured image using a learning model created by learning about a specific area defined by a predetermined number of the points in an imaging area using a captured image for learning; and a detection unit configured to detect the specific area by classifying the plurality of points for each specific area based on the direction.

5 Claims, 9 Drawing Sheets

(56) References Cited

U.S. PATENT DOCUMENTS

| | | | |
|---|---|---|---|
| 2020/0090516 A1* | 3/2020 | Sert | G08G 1/0969 |
| 2020/0134331 A1* | 4/2020 | Poddar | G06K 9/00812 |
| 2020/0151895 A1* | 5/2020 | Kaneko | G06T 7/60 |
| 2020/0294310 A1* | 9/2020 | Lee | G06T 7/13 |
| 2020/0372285 A1* | 11/2020 | Adams | G06K 9/00798 |
| 2021/0042541 A1* | 2/2021 | Kokubo | G06K 9/6256 |

* cited by examiner

FIG.7A
BIPARTITE GRAPH
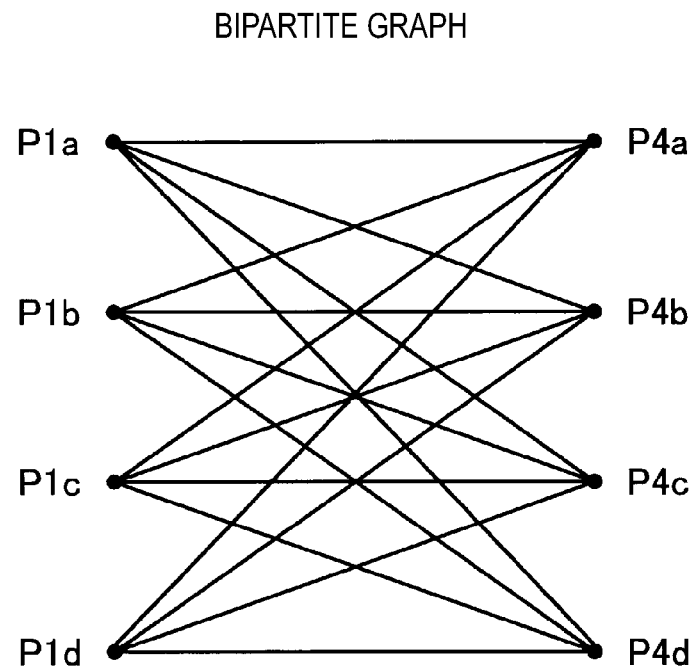
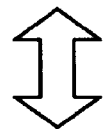
FIG.7B
COST MATRIX

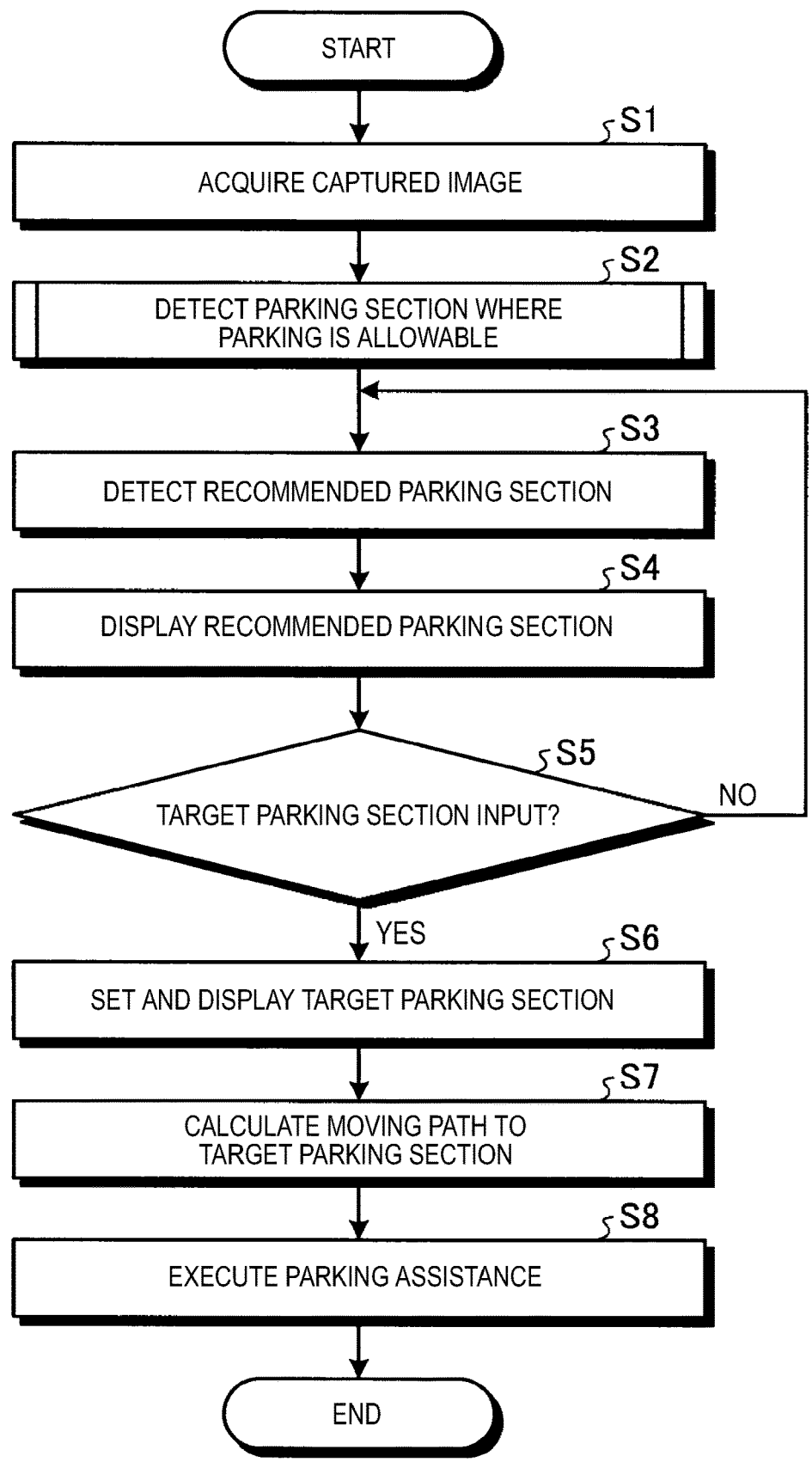

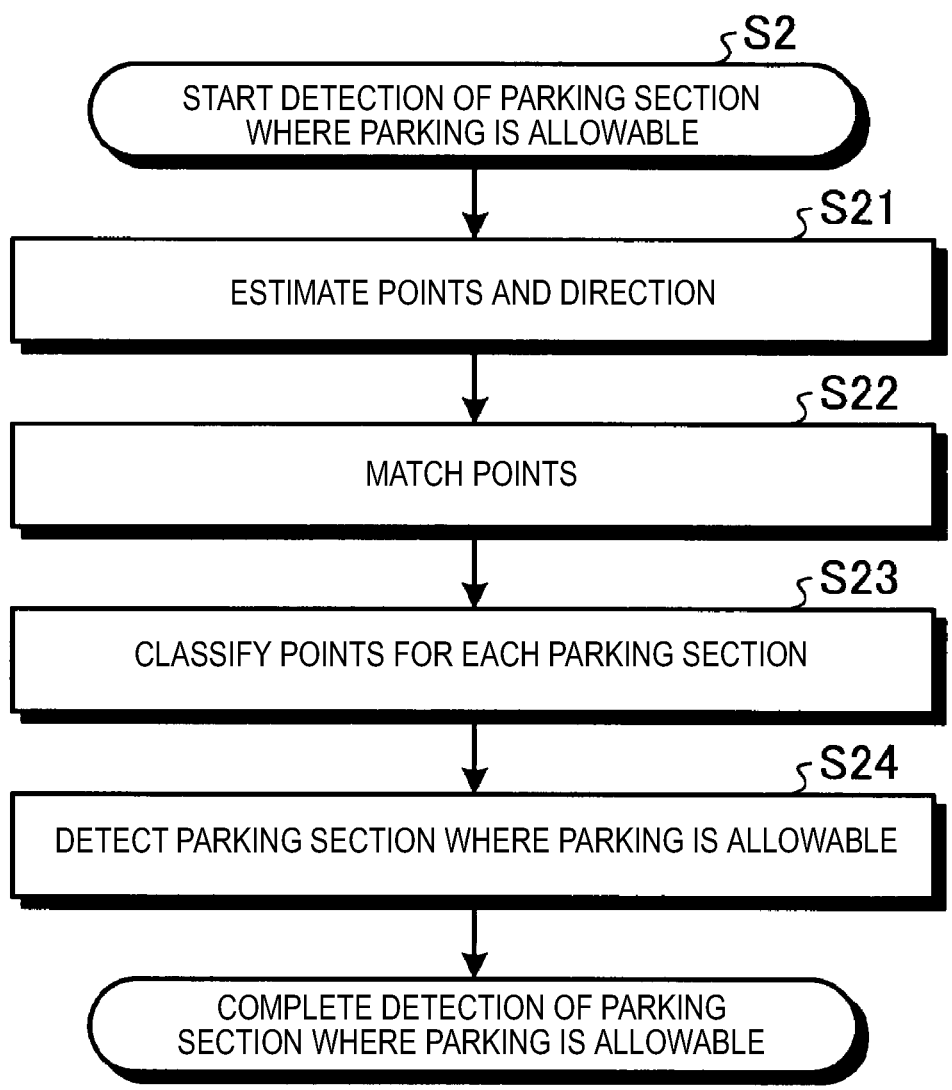

SPECIFIC AREA DETECTION DEVICE

CROSS REFERENCE TO RELATED APPLICATIONS

This application is based on and claims priority under 35 U.S.C. § 119 to Japanese Patent Application 2019-145692, filed on Aug. 7, 2019, the entire content of which is incorporated herein by reference.

TECHNICAL FIELD

This disclosure relates to a specific area detection device.

BACKGROUND DISCUSSION

In related art, there is a technique of capturing, for example, in a vehicle, an image of a parking lot and detecting individual parking sections based on the captured image. In this technique, a parking section is detected by recognizing section dividing lines (for example, a white line) indicating the parking section from the captured image, for example.

Examples of the related art include WO 2017/068701 and Japanese Patent No. 5786833.

However, in the related art described above, detection accuracy of a parking section is significantly reduced when the section dividing lines appearing in the captured image is insufficient (small, discontinuous, blurred or the like).

A need thus exists for a specific area detection device which is not susceptible to the drawback mentioned above.

SUMMARY

A specific area detection device according to an embodiment of this disclosure is, for example, a specific area detection device that detects a specific area in an imaging area based on a captured image, and includes: an estimation unit configured to estimate a plurality of points and a direction of a straight line connecting two predetermined points among the plurality of points from a captured image using a learning model created by learning about a specific area defined by a predetermined number of the points in an imaging area using a captured image for learning; and a detection unit configured to detect the specific area by classifying the plurality of points for each specific area based on the direction.

BRIEF DESCRIPTION OF THE DRAWINGS

The foregoing and additional features and characteristics of this disclosure will become more apparent from the following detailed description considered with the reference to the accompanying drawings, wherein:

FIGS. 7A-7B are schematic diagrams showing an example of a bipartite graph and the cost matrix according to the embodiment;

FIG. 9 is a flowchart showing overall processing performed by the specific area detection device according to the embodiment; and FIG. 10 is a flowchart showing details of processing in step S2 in FIG. 9.

DETAILED DESCRIPTION

Hereinafter, an exemplary embodiment of this disclosure will be disclosed. A configuration of the embodiment shown below and actions, results, and effects provided by the configuration are examples. This disclosure can be implemented by configurations other than those disclosed in the following embodiment, and can obtain at least one of various effects based on the basic configuration and derivative effects.

Figure 1:
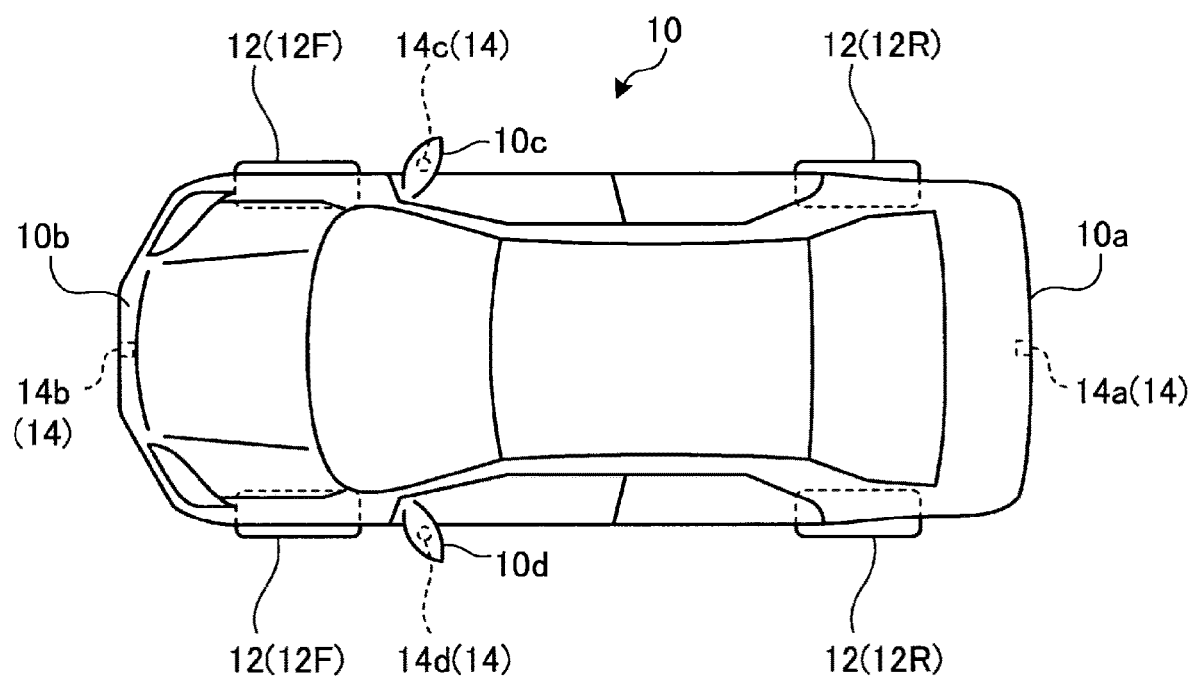
FIG. 1 is a schematic plan view showing an example of a vehicle on which a specific area detection device according to an embodiment can be mounted.

FIG. 1 is a schematic plan view showing an example of a vehicle 10 on which a specific area detection device according to the embodiment can be mounted. The vehicle 10 may be, for example, an automobile (internal combustion engine automobile) using an internal combustion engine (engine not shown) as a driving source, or an automobile (electric automobile, fuel-cell automobile, and the like) using an electric motor (motor not shown) as the driving source, or an automobile (hybrid automobile) using both the internal combustion engine and the electric motor as the driving source. The vehicle 10 can be equipped with various transmission devices, and can also be equipped with various devices (system, component, and the like) necessary for driving the internal combustion engine or the electric motor. Further, a method, the number, a layout, and the like of the device related to driving wheels 12 (front wheel 12F, rear wheel 12R) of the vehicle 10 can be set variously.

As shown in FIG. 1, for example, four imaging units 14a to 14d are provided as a plurality of imaging units 14 on the vehicle 10. The imaging units 14 are, for example, a digital camera including an imaging element such as a charge coupled device (CCD) or a CMOS image sensor (CIS). The imaging units 14 can output moving image data (captured image data) at a predetermined frame rate. Each of the imaging units 14 has a wide-angle lens or a fisheye lens, and can capture, for example, a range of 140° to 220° in a horizontal direction. In addition, an optical axis of the imaging units 14 may be set obliquely downward. Thus, the imaging units 14 sequentially capture an image of surrounding environment outside the vehicle 10 including a road surface on which the vehicle 10 can move, an index attached to the road surface (including a section dividing line that indicates a parking section, a lane separation line, an arrow, and the like), and an object (for example, a pedestrian and a vehicle and the like as an obstacle), and output the captured image as captured image data.

The imaging units 14 are provided on an outer peripheral portion of the vehicle 10. The imaging unit 14a is provided, for example, on a rear side of the vehicle 10, that is, on a rear side in a vehicle front-rear direction, and at a substantially central end portion in a vehicle width direction, for example, at an upper position of a rear bumper 10a, and is capable of capturing an image of a rear area including a rear end portion of the vehicle 10 (for example, the rear bumper 10a). Further, the imaging unit 14b is provided, for example, on a front side of the vehicle 10, that is, on a front side in the vehicle front-rear direction, and at a substantially central end portion in the vehicle width direction, for example, at a front bumper 10b or a front grille, and is capable of capturing a front image including a front end portion of the vehicle 10 (for example, the front bumper 10b).

The imaging unit 14c is provided, for example, on a right side end portion of the vehicle 10, for example, on a door mirror 10c at a right side, and is capable of capturing a right side image including an area centered on the right side of the vehicle 10 (for example, an area from right front to right rear). The imaging unit 14d is provided, for example, on a left side end portion of the vehicle 10, for example, on a door mirror 10d at a left side, and is capable of capturing a left side image including an area centered on the left side of the vehicle 10 (for example, an area from left front to left rear).

The specific area detection device according to the present embodiment can detect a parking section, which is an example of a specific area, by executing calculation processing based on a captured image obtained by the imaging units 14 (hereinafter, also referred to as a captured image).

Figure 2:
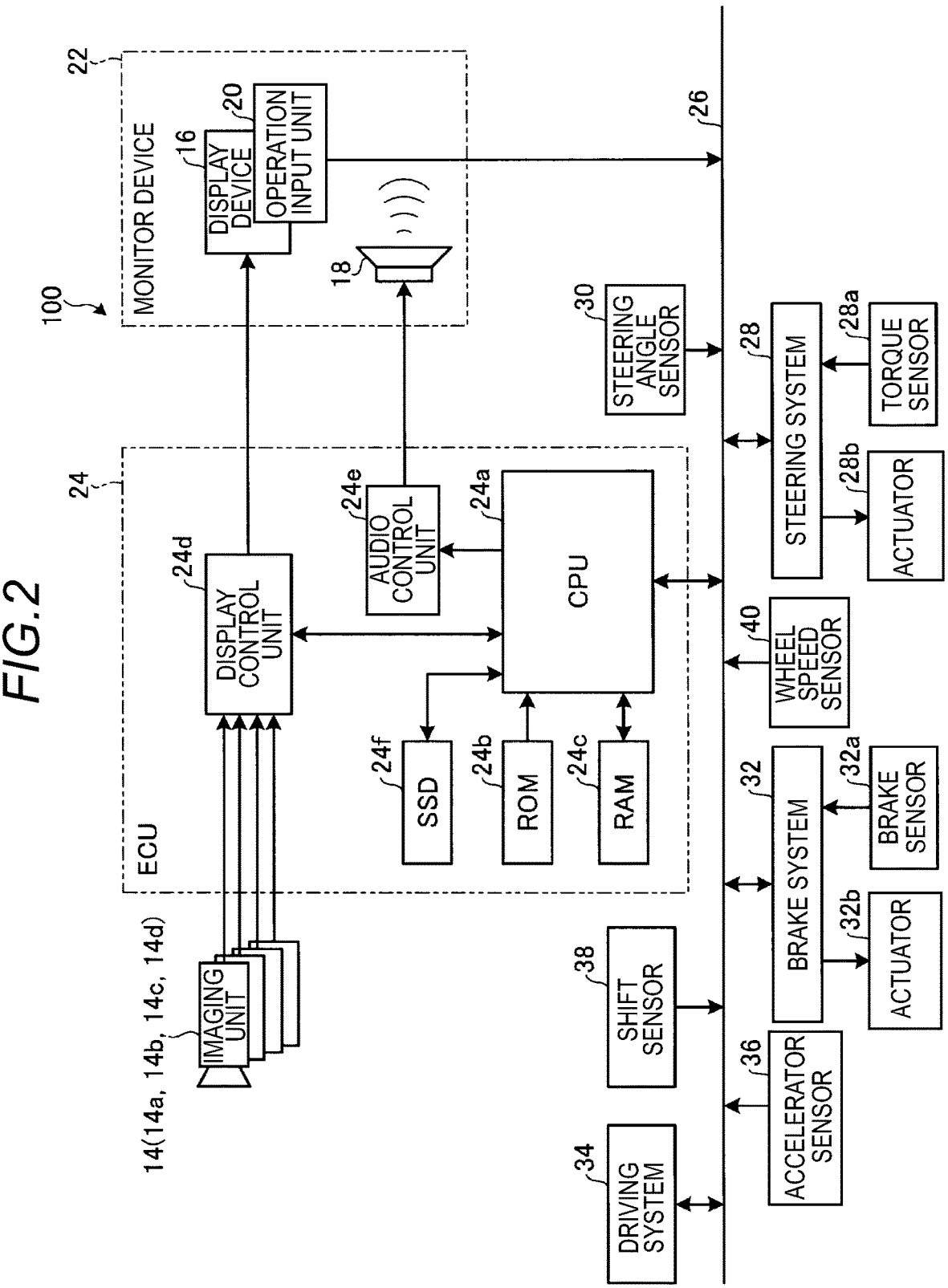
FIG. 2 is an exemplary block diagram of the configuration of a parking assistance system including the specific area detection device according to the embodiment.

FIG. 2 is an exemplary block diagram of the configuration of a parking assistance system 100 including the specific area detection device according to the embodiment. A display device 16 and an audio output device 18 are provided in a vehicle interior of the vehicle 10. The display device 16 is, for example, a liquid crystal display (LCD) or an organic electro-luminescence display (OELD). The audio output device 18 is, for example, a speaker. The display device 16 is covered with a transparent operation input unit 20 such as a touch panel, for example. An occupant (for example, a driver) can visually recognize an image displayed on a display screen of the display device 16 via the operation input unit 20. Further, the occupant can execute an operation input by touching, pushing or moving to operate the operation input unit 20 with a finger or the like at a position corresponding to the image displayed on the display screen of the display device 16. The display device 16, the audio output device 18, the operation input unit 20, and the like are provided on, for example, a monitor device 22 located at a center portion of a dashboard of the vehicle 10 in the vehicle width direction, that is, a left-right direction. The monitor device 22 may include an operation input unit (not shown) such as a switch, a dial, a joystick, and a push button. The monitor device 22 can also be used as a navigation system or an audio system, for example.

As shown in FIG. 2, the parking assistance system 100 includes an electronic control unit (ECU) 24 in addition to the imaging units 14 (14a to 14d) and the monitor device 22. In the parking assistance system 100, the ECU 24 and the monitor device 22 are electrically connected via an in-vehicle network 26 as an electric communication line. The in-vehicle network 26 is configured as, for example, a controller area network (CAN). The ECU 24 can control various systems by sending a control signal through the in-vehicle network 26. For example, in the parking assistance system 100, in addition to the ECU 24, the monitor device 22, and the like, a steering system 28, a steering angle sensor 30, a brake system 32, a driving system 34, an accelerator sensor 36, a shift sensor 38, a wheel speed sensor 40, and the like are electrically connected via the in-vehicle network 26. The ECU 24 can control the steering system 28, the brake system 32, the driving system 34, and the like by sending the control signal through the in-vehicle network 26. The ECU 24 can receive a detection result of a torque sensor 28a, a brake sensor 32a, the steering angle sensor 30, the accelerator sensor 36, the shift sensor 38, the wheel speed sensor 40, and the like, and the operation signal of the operation input unit 20 and the like via the in-vehicle network 26.

The ECU 24 includes, for example, a central processing unit (CPU) 24a, a read only memory (ROM) 24b, a random access memory (RAM) 24c, a display control unit 24d, an audio control unit 24e, a solid state drive (SSD, a flash memory) 24f, and the like. The CPU 24a executes various kinds of calculation processing and controls.

The CPU 24a reads a program stored in a nonvolatile storage device such as the ROM 24b, and executes the calculation processing in accordance with the program. The ROM 24b stores each program, parameters necessary for executing the program, and the like. The RAM 24c temporarily stores various kinds of data used in calculation by the CPU 24a. In addition, the display control unit 24d mainly executes image processing using image data obtained by the imaging units 14 and synthesis of the image data displayed on the display device 16, among the calculation processing performed in the ECU 24. In addition, the audio control unit 24e mainly executes processing of audio data output by the audio output device 18 among the calculation processing in the ECU 24. The SSD 24f is a rewritable nonvolatile storage unit, and can store data even when power of the ECU 24 is turned off. The CPU 24a, the ROM 24b, the RAM 24c, and the like can be integrated in the same package. Further, instead of the CPU 24a, a logic circuit, another logical operation processor such as a digital signal processor (DSP), or the like may be used as the ECU 24. A hard disk drive (HDD) may be provided instead of the SSD 24f, or the SSD 24f and the HDD may be provided separately from the ECU 24.

As shown in FIG. 1, the vehicle 10 is, for example, a four-wheeled vehicle, and includes left and right front wheels 12F, and left and right rear wheels 12R. Any of the four wheels 12 can be configured to be steerable. As shown in FIG. 2, the steering system 28 steers at least two wheels 12 of the vehicle 10. The steering system 28 includes a torque sensor 28a and an actuator 28b. The steering system 28 is electrically controlled by the ECU 24 or the like to operate the actuator 28b. The steering system 28 is, for example, an electric power steering system, a steer by wire (SBW) system, or the like. The steering system 28 adds a torque, that is, an assist torque to a steering unit (for example, a steering wheel) by the actuator 28b to supplement a steering force, and steers the wheels 12 by the actuator 28b. In this case, the actuator 28b may steer one wheel 12 or steer the plurality of wheels 12. The torque sensor 28a detects the torque applied to the steering unit by the driver, for example.

The steering angle sensor 30 is, for example, a sensor that detects a steering amount of the steering unit. The steering angle sensor 30 is configured using, for example, a Hall element or the like. The ECU 24 acquires the steering amount of the steering unit by the driver, the steering amount of each wheel 12 during automatic steering, and the like from the steering angle sensor 30 to execute various controls. The steering angle sensor 30 detects a rotation angle of a rotation portion contained in the steering unit.

The brake system 32 is, for example, an anti-lock brake system (ABS) that prevents a lock of a brake, an anti-skid brake system (ESC: electronic stability control) that prevents a skid of the vehicle 10 at a time of cornering, an electric braking system that increases braking power (executes brake assist), and a brake by wire (BBW). The brake system 32 applies a braking force to the wheels 12, as a result, to the vehicle 10 via the actuator 32b. Further, the brake system 32 can detect a lock of the brake, an idling of the wheel 12, a sign of the skid, and the like based on a rotation difference between the left and right wheels 12 to execute various controls. The brake sensor 32a is, for example, a sensor that detects a position of a movable portion of a braking operation unit (for example, a brake pedal).

The driving system 34 is an internal combustion engine (engine) system or a motor system as the driving source. The driving system 34 controls a fuel injection amount and a fuel intake amount of the engine and controls an output value of the motor according to an operation amount (for example, a depression amount of an accelerator pedal) required by the driver (user) which is detected by the accelerator sensor 36. Further, the output value of the engine or the motor can be controlled in cooperation with the control of the steering system 28 or the brake system 32 according to a traveling state of the vehicle 10 regardless of an operation of the user. The same applies to a case where the vehicle 10 is traveling in an automatic driving mode.

The accelerator sensor 36, for example, is a sensor that detects a position of a movable portion of an acceleration operation unit (for example, an accelerator pedal). The accelerator sensor 36 can detect the position of the accelerator pedal as the movable portion.

The shift sensor 38 is, for example, a sensor that detects a position of a movable portion of a gear shift operation unit (for example, a shift lever). The shift sensor 38 can detect the position of a lever, an arm, a button, or the like as the movable portion. The shift sensor 38 may include a displacement sensor or may be configured as a switch. The ECU 24 can determine whether the vehicle 10 receives a forward traveling request or a backward traveling request based on a detection result of the shift sensor 38.

The wheel speed sensor 40 is a sensor that is provided in each wheel 12 and detects a rotation amount and a rotation number per unit time of each wheel 12, and outputs a wheel speed pulse number indicating the detected rotation number as a detection value. The wheel speed sensor 40 may be configured using a Hall element, for example. The ECU 24 calculates a vehicle speed, a movement amount and the like of the vehicle 10 based on the detection value acquired from the wheel speed sensor 40 to execute various controls. When calculating the vehicle speed of the vehicle 10 based on the detection value acquired by the wheel speed sensor 40 of each wheel 12, the ECU 24 determines the vehicle speed of the vehicle 10 based on a speed of the wheel 12 having the smallest detection value among four wheels to execute various controls.

Configurations, arrangements, electrical connection forms, and the like of the various sensors and actuators described above are examples, and can be set (changed) in various ways.

For example, the ECU 24 may execute parking assistance processing based on the captured image acquired from the imaging units 14, and transmit a peripheral image generated based on the captured image data and data related to voice to the monitor device 22.

Figure 3:
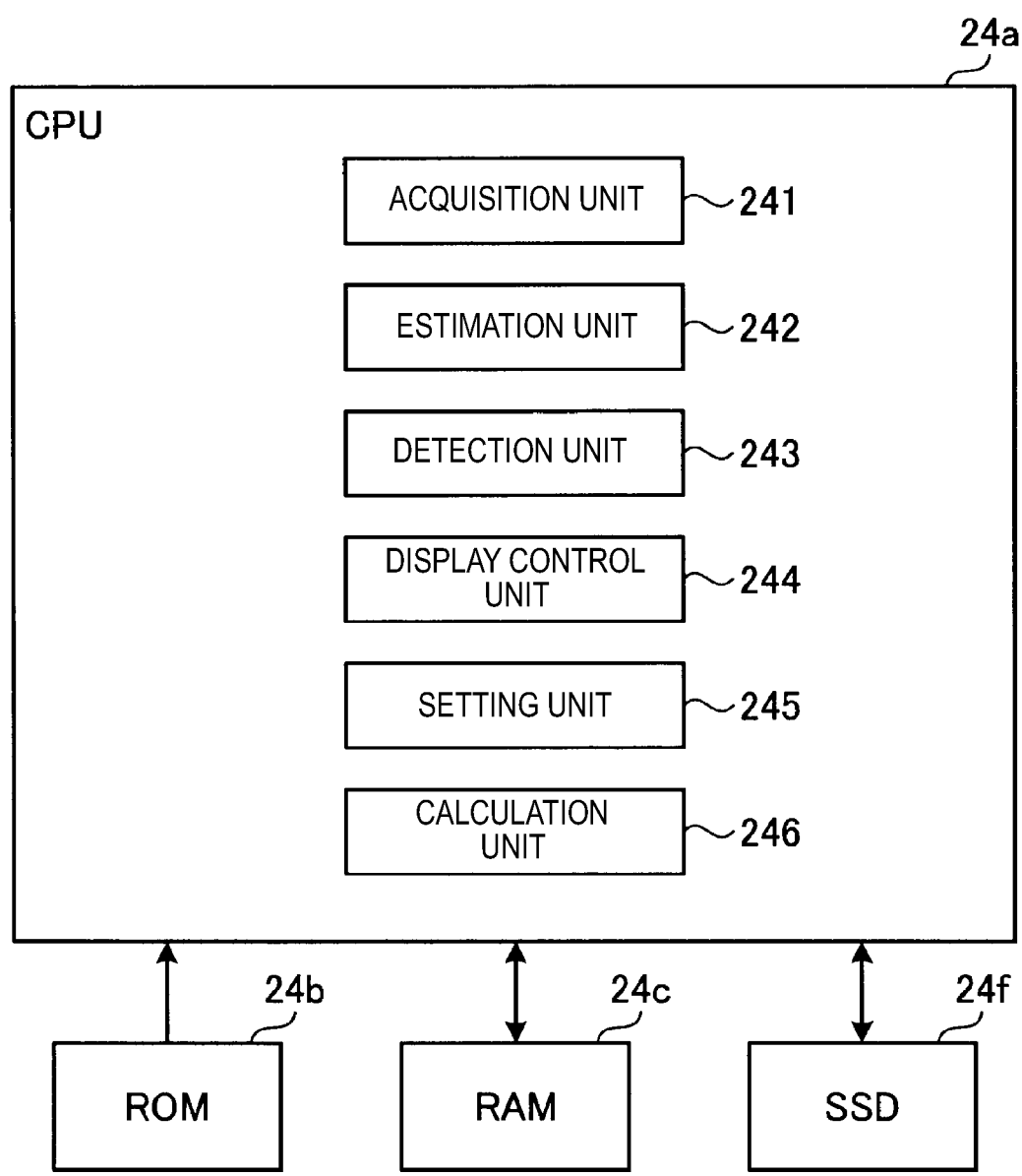
FIG. 3 is an exemplary block diagram of the configuration of a CPU according to the embodiment.

FIG. 3 is an exemplary block diagram of the configuration of the CPU 24a (specific area detection device) according to the embodiment. The CPU 24a detects a parking section in an imaging area based on, for example, the captured image. Specifically, the CPU 24a includes, as each module, an acquisition unit 241, an estimation unit 242, a detection unit 243, a display control unit 244, a setting unit 245, and a calculation unit 246. Each module is implemented by the CPU 24a reading a program stored in a storage device such as the ROM 24b and executing the program. In the following, when explaining processing performed by the CPU 24a other than those performed by each unit 241 to 246, an operation subject is referred to as "CPU 24a".

The acquisition unit 241 acquires various data from each configuration. For example, the acquisition unit 241 acquires the captured image from the imaging units 14.

The estimation unit 242 uses a learning model created by learning about a specific area defined by a predetermined number of points in an imaging area using a captured image for learning, so as to estimate a plurality of points and a direction of a straight line connecting two predetermined points from a captured image. For example, the estimation unit 242 uses the learning model created by learning about a quadrangular parking section defined by four corner points as the specific area, so as to estimate a plurality of points and a direction of a straight line connecting two predetermined points from a captured image.

Figure 4:
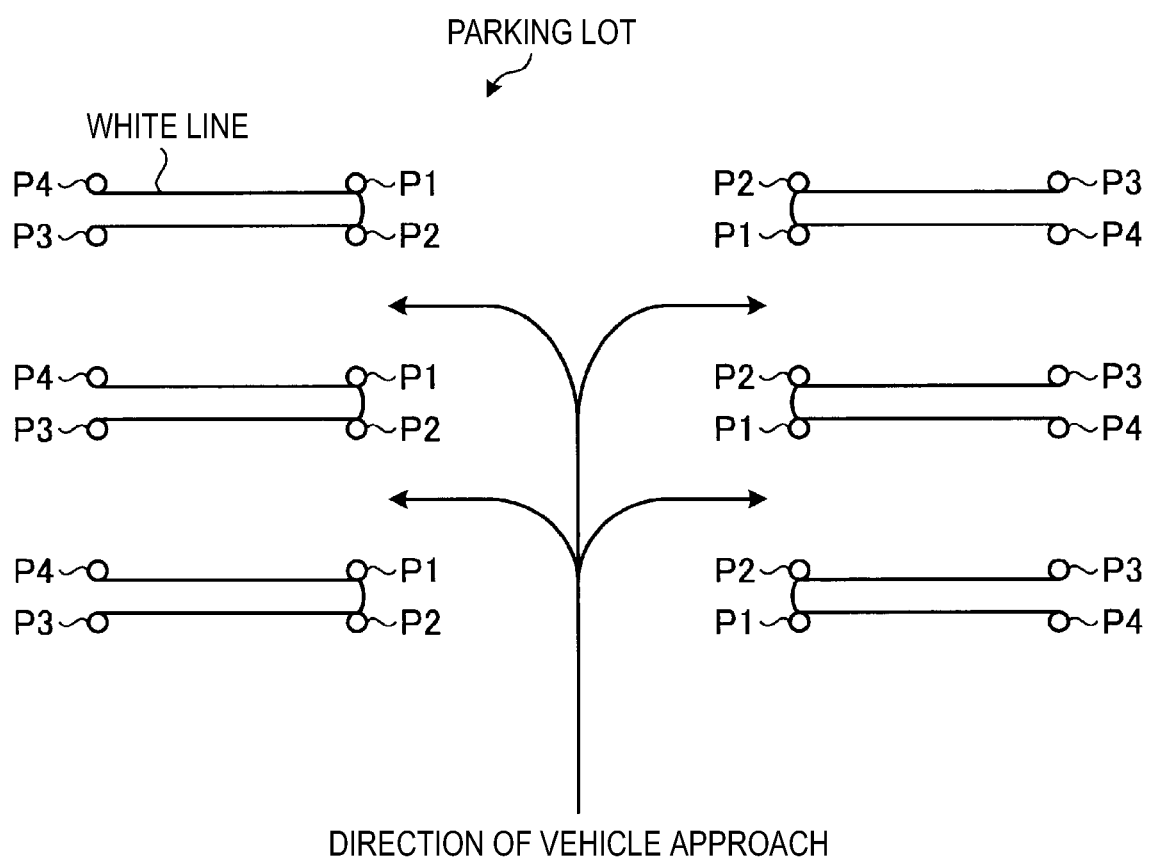
FIG. 4 is an explanatory diagram of four corner points defining a parking section according to the embodiment.

Here, FIG. 4 is an explanatory diagram of four corner points defining a parking section according to the embodiment. In the learning model according to the present embodiment, a quadrangular parking section in which a white line is drawn in a part is defined by four corner points P1 to P4. Specifically, based on a direction of vehicle approach toward the parking sections, a point on a front left side is point P1, a point on a front right side is point P2, a point on a back right side is point P3, and a point on a back left side is point P4. That is, when estimating the plurality of points, the estimation unit 242 classifies and estimates each of the plurality of points into four kinds of points including a first point, a second point, a third point, and a fourth point in a predetermined rotation direction based on the direction of vehicle approach toward the parking sections.

The learning model described above can be created, for example, by deep learning (deep learning). In deep learning, learning is performed using teacher data (correct answer data) defining a parking section by the points P1 to P4. In this case, for example, a function is constructed using parameters, a loss with respect to the correct answer data is defined, and learning is performed by minimizing the loss.

Referring back to FIG. 3, for example, when estimating the points, the estimation unit 242 preferably estimates the points as a Gaussian distribution, and performs post-processing by a non maximum suppression (NMS). As a result, accuracy of point estimation can be improved.

Further, the estimation unit 242 estimates the direction of the straight line connecting the two predetermined points (hereinafter, simply referred to as a "direction") in addition to the points from the captured image using the learning model. For example, when estimating the direction of the straight line connecting the two predetermined points, the estimation unit 242 estimates a direction of a straight line connecting the first point and the second point which are estimated to belong to the same parking section. In this case, a combination of the first point and the second point is not a combination of the point P1 and the point P3, or of the point P2 and the point P4, which are diagonal points among two points of the point P1 to the point P4, and specifically, the combination may be at least one of a combination of the point P1 and the point P2, a combination of the point P1 and the point P4, a combination of the point P2 and the point P3, and a combination of the point P3 and the point P4. However, a method of estimating the points and the direction is not limited to the method described above.

Figure 5:
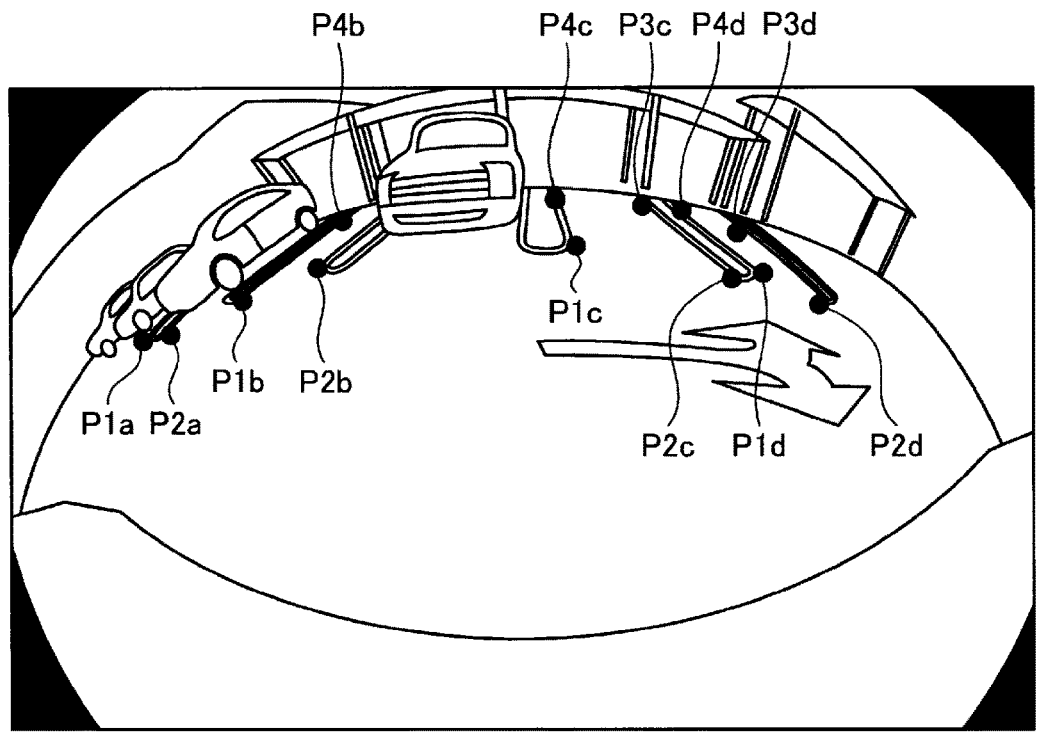
FIG. 5 is a schematic diagram showing an example of a captured image according to the embodiment.
Figure 6:
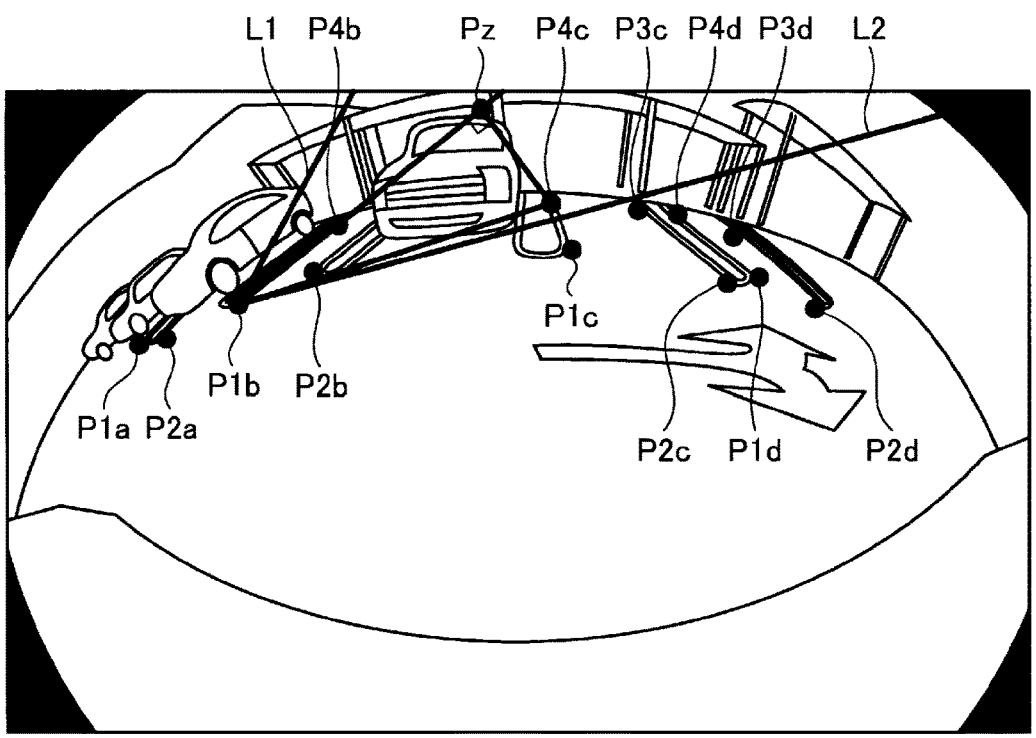
FIG. 6 is an explanatory diagram of a method of calculating an area of a triangle used as a cost in a cost matrix according to the embodiment.

Processing of the detection unit 243 will be described with reference to FIGS. 5 to 7. FIG. 5 is a schematic diagram showing an example of the captured image according to the embodiment. FIG. 6 is an explanatory diagram of a method of calculating an area of a triangle used as a cost in a cost matrix according to the embodiment. FIG. 7 is a schematic diagram showing an example of a bipartite graph and the cost matrix according to the embodiment.

As shown in FIG. 5, it is assumed that points P1a, P2a, points P1b, P2b, a point P4b, points P1c, P2c, a point P3c, a point P4c, points P1d, P2d, a point P3d and a point P4d are estimated by the estimation unit 242 as corner points of each parking section in the captured image (fisheye image). Even when a portion actually exists as the corner point of each parking section, the portion does not become a target if the portion is blocked by a vehicle or the like and cannot be seen. Then, here, as an example, when any one of the four points of the point P1 to the point P4 forming one parking section is visible, even though not all of the four points are visible, the point becomes a calculated target.

Then, since the detection unit 243 performs matching between points (classifying the plurality of points for each parking section), a correspondence between the points is regarded as the bipartite graph, resulting in an optimal matching problem of the bipartite graph. Specifically, the detection unit 243 performs matching on the plurality of points based on the direction, and classifies the plurality of points for each parking section, thereby detecting the parking sections. For example, when matching is performed on the plurality of points based on the direction, the detection unit 243 searches for a combination of a first point and a second point whose cost is minimized by using a cost matrix corresponding to the bipartite graph of the plurality of first points and the plurality of second points, thereby classifying the plurality of points for each parking section. In this case, when a predetermined first point and a predetermined second point are selected, the detection unit 243 calculates a cost based on three points including the predetermined first point, the predetermined second point, and an intersection point of a perpendicular line drawn from the predetermined second point with respect to a straight line indicating a direction estimated in relation to the predetermined first point and the straight line. For example, an area of a triangle having the three points as vertices or an area of a parallelogram obtained by combining two triangles is calculated as the cost.

In order to solve the optimal matching problem, a Hungarian method is used. The Hungarian method is a technique for solving a so-called allocation problem, and is a well-known algorithm for performing an operation such as, for a matrix, subtracting a minimum value of a row from each element of each row, and then subtracting a minimum value of a column from each element of each column. Here, in the Hungarian method, the cost matrix corresponding to the bipartite graph is created, and a combination with the minimum cost is searched for. That is, the detection unit 243 searches for a combination of the first point and the second point whose cost is the minimum by applying the Hungarian method to the cost matrix.

Specifically, as shown in FIG. 6, for example, when the point P1b (the predetermined first point) and the point P4c (the predetermined second point) are selected, the detection unit 243 calculates, as a cost, an area of a triangle having three points as vertices: the point P1b, the point P4c, and an intersection point Pz of a perpendicular line drawn from the point P4c with respect to a straight line indicating the estimated direction in relation to the point P1b (a straight line connecting the point P1b and the point P4b) and the straight line. In this example, in consideration of calculation efficiency, among the points P4x (x=a, b, c, d, . . . ), only those in a range inside straight lines L1 and L2 having a predetermined angle (for example, 20 degrees) with a straight line connecting the point P1b and the point P4b based on the point P1b are taken as targets.

FIG. 7A shows the bipartite graph when the point P1 (point P1a to point P1d) and the point P4 (point P4a to point P4d) are selected from the point P1 to the point P4. In addition, FIG. 7B shows a cost matrix in this case. Areas $S_1$ to $S_{16}$ are areas (cost) of the triangles calculated by the method described above.

In this way, by searching for the combination of the point P1 (point P1a to point P1d) and the point P4 (point P4a to point P4d), an appropriate combination can be easily obtained with high accuracy. This is because, when two points belonging to the same parking section are selected, the area of the triangle is reduced.

Similarly, not only the point P1 and the point P4, but also the point P2 and the point P3, and the point P1 and the point P2 can be calculated (matched) as described above to obtain the appropriate combination.

After a maximum likelihood estimation for combinations of the point P1 and the point P4, the point P2 and the point P3, as well as the point P1 and the point P2, the detection unit 243 classifies the plurality of points for each parking section by integrating matching results based on, for example, the combination of the point P1 and the point P2. The combination of the point P1 and the point P4 and the combination of the point P2 and the point P3 that are not integrated are excluded from the estimation result.

Figure 8:
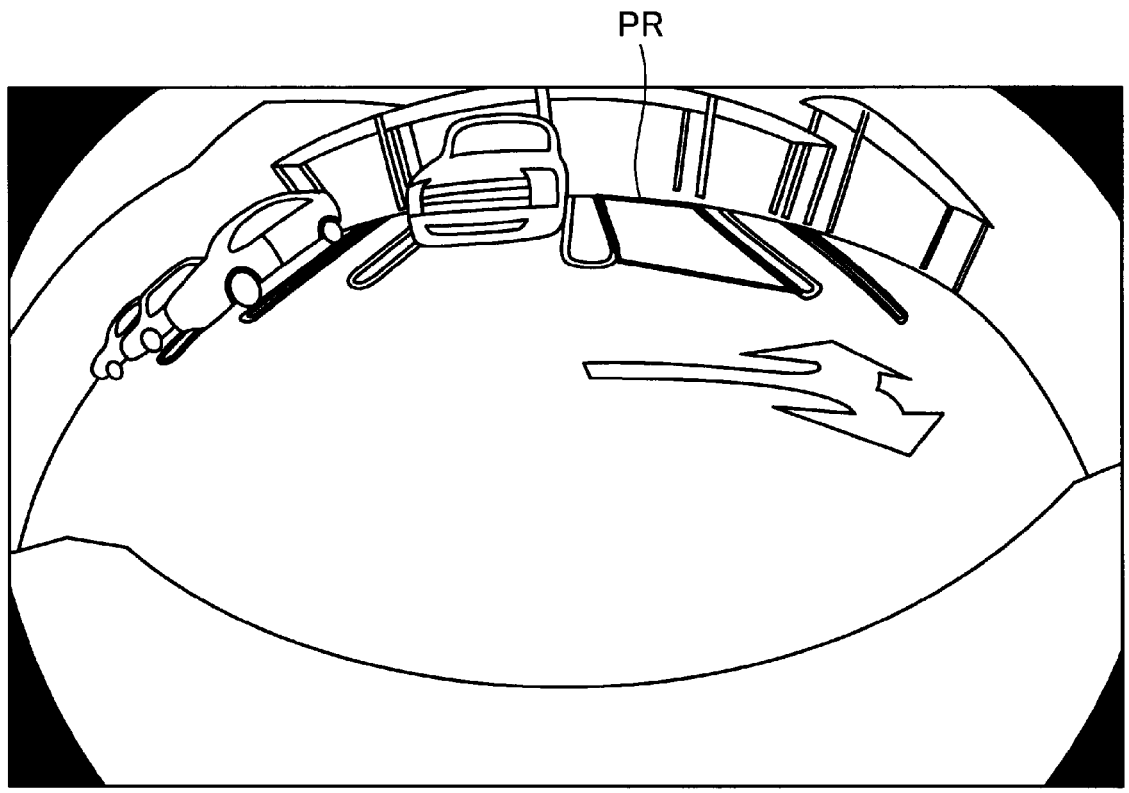
FIG. 8 is a schematic diagram showing a display example of a recommended parking section according to the embodiment.

Returning to FIG. 3, the display control unit 244 displays the parking sections detected by the detection unit 243 on the display device 16 (display unit). Here, FIG. 8 is a schematic diagram showing a display example of a recommended parking section according to the embodiment. A recommended parking section PR shown in FIG. 8 is, for example, one parking section when there is a plurality of parking sections where the parking is allowable.

Returning to FIG. 3, when the user performs an input operation of a target parking section using the operation input unit 20, the setting unit 245 sets the target parking section.

When the setting unit 245 sets the target parking section, the calculation unit 246 calculates a moving path from a current position of the vehicle to the target parking section using a well-known moving path calculation technique.

Next, an overall process performed by the specific area detection device according to the embodiment will be described with reference to FIG. 9. FIG. 9 is a flowchart showing the overall process performed by the specific area detection device according to the embodiment.

First, in step S1, the acquisition unit 241 acquires the captured image from the imaging units 14. Next, in step S2, the CPU 24a detects the parking section where the parking is allowable. Here, FIG. 10 is a flowchart showing the details of the process in step S2 in FIG. 9.

In step S21, the estimation unit 242 uses the learning model for estimating the quadrangular parking section defined by four corner points to estimate a plurality of points and a direction of the straight line connecting two predetermined points from the captured image.

Next, in step S22, the detection unit 243 performs matching on the points (FIGS. 6 and 7). Accordingly, in step S23, the detection unit 243 classifies the plurality of points for each parking section. Then, in step S24, the detection unit 243 detects a parking section where the parking is allowable based on a predetermined reference.

Returning to FIG. 9, after step S2, in step S3, the CPU 24a detects a recommended parking section. For example, when there is a plurality of parking sections where the parking is allowable, the CPU 24a determines one parking section as the recommended parking section based on a predetermined reference.

Next, in step S4, the display control unit 244 causes the display device 16 to display the recommended parking section determined in step S3.

Next, in step S5, the CPU 24a determines whether the user performs the input operation of a target parking section using the operation input unit 20, and the process proceeds to step S6 in a case of Yes and returns to step S3 in a case of No.

In step S6, the setting unit 245 sets the target parking section, and the display control unit 244 causes the display device 16 to display that the target parking section is set.

Next, in step S7, the calculation unit 246 calculates a moving path from a current position of the vehicle to the target parking section by using the well-known moving path calculation technique.

Next, in step S8, the CPU 24a executes the parking assistance. For example, when "fully automatic parking assistance" is executed as the parking assistance, the CPU 24a controls the steering system 28, the brake system 32, the driving system 34, and the like to move the vehicle 10 along the moving path. In addition, when "semi-automatic parking assistance" or "guidance assistance" is executed as the parking assistance, the CPU 24a notifies the driver of an operation content by voice or display, and the driver executes some or all of the operations to implement the parking operation.

In this way, according to the specific area detection device of present embodiment, the plurality of points and the direction of the straight line connecting the two predetermined points are estimated from the captured image using the learning model, and the plurality of points can be classified for each specific area based on the direction, so that the specific area can be detected with high accuracy.

Specifically, the quadrangular parking section defined by four corner points as the specific area can be estimated with high accuracy. For example, when a white line indicating the parking section is insufficient (small, discontinuous, blurred, or the like), the detection accuracy is greatly reduced in a technique of detecting a parking section by recognizing a white line of related art. However, according to the specific area detection device of the present embodiment, the detection accuracy of the parking section does not decrease even in such a case by a method of estimating the plurality of points and the direction from the captured image using the learning model.

Further, for example, in the related art, in a method of using a parked vehicle in vicinity of the parking section as a reference when detecting the parking section, the parking section cannot be detected unless there is a parked vehicle as the reference. However, according to the specific area detection device of the present embodiment, by the method of estimating the plurality of points and the direction from the captured image using the learning model, the parking section can be detected with high accuracy without using a parked vehicle.

In particular, in a case where the parking section is a long distance, the detection accuracy of the parking section is greatly reduced regardless of presence or absence of the parked vehicle, which is a reference in the related art. However, according to the specific area detection device of the present embodiment, the detection accuracy of the parking section is hardly or not reduced by the method of estimating the plurality of points and the direction from the captured image using the learning model.

Further, when estimating the parking section, the parking section can be estimated easily with high accuracy by using the bipartite graph and the cost matrix.

Further, by applying the Hungarian method to the cost matrix, it is possible to estimate the parking section with high accuracy with a simple algorithm.

Further, by displaying the detected parking section, parking assistance to the driver can be performed.

A program for parking assistance process executed by the CPU 24a according to the present embodiment may be provided by being recorded in a computer-readable recording medium such as a CD-ROM, a flexible disk (FD), a CD-R, a digital versatile disk (DVD) or the like in an installable or executable form of a file.

Further, a parking assistance process program may be stored in a computer connected to a network such as Internet and provided by being downloaded via a network. The parking assistance process program executed in the present embodiment may be provided or distributed via a network such as Internet.

Although the embodiment and the modification disclosed here are described, the embodiment and the modification are presented as examples and are not intended to limit the scope of this disclosure. These new embodiments can be implemented in other various forms, and various omissions, replacements, and changes can be made without departing from the spirit of this disclosure. The embodiments and modifications thereof are included in the scope and gist of the disclosure, and are also included in the disclosure described in the claims and equivalents thereof.

For example, the specific area to be detected based on the captured image is not limited to a parking section, and may be a person, a vehicle, or the like. In this case, a detection target may be defined by a predetermined number of points.

The captured image to be used in learning or inference is not limited to a fisheye image, and may be a wide-angle image, a normal image, or an overhead image synthesized based on a plurality of captured images.

Further, in the present embodiment, the parking section in the learning model has a quadrangular shape in which a white line is drawn in a part, but the parking section is not limited thereto. For example, the parking section may be a quadrangle shape entirely drawn by a white line, or may be a space between two vehicles without the white lines.

A specific area detection device according to an embodiment of this disclosure is, for example, a specific area detection device that detects a specific area in an imaging area based on a captured image, and includes: an estimation unit configured to estimate a plurality of points and a direction of a straight line connecting two predetermined points among the plurality of points from a captured image using a learning model created by learning about a specific area defined by a predetermined number of the points in an imaging area using a captured image for learning; and a detection unit configured to detect the specific area by classifying the plurality of points for each specific area based on the direction.

According to this configuration, the plurality of points and the direction of the straight line connecting the two predetermined points are estimated from the captured image using the learning model, and the plurality of points is classified for each of the specific areas based on the direction, so that the specific area can be detected with high accuracy.

In the specific area detection device, for example, the estimation unit may estimate the plurality of points and the direction of the straight line connecting the two predetermined points from a captured image using a learning model created by learning about a quadrangular parking section defined by four corner points as the specific area. In addition, the detection unit may detect the parking section by classifying the plurality of points for each parking section based on the direction.

According to this configuration, the quadrangular parking section defined by four corner points as the specific area can be estimated with high accuracy.

In addition, in the specific area detection device, for example, the estimation unit may be configured to, when estimating the plurality of points, estimate the plurality of points with each of the plurality of points classified into any of four kinds of points including a first point, a second point, a third point, and a fourth point in a predetermined rotation direction based on a direction of vehicle approach toward the parking section, and when estimating the direction of the straight line connecting the two predetermined points, estimate a direction of a straight line connecting the first point and the second point which are estimated to belong to the same parking section. In addition, the detection unit may be configured to classify the plurality of points for each parking section based on the direction by searching for a combination of the first point and the second point with the minimum cost using a cost matrix corresponding to a bipartite graph of a plurality of the first points and a plurality of the second points, and in that case, when a predetermined first point and a predetermined second point are selected, calculate a cost based on three points including the predetermined first point, the predetermined second point, and an intersection point of a perpendicular line drawn from the predetermined second point with respect to the straight line indicating the direction estimated in relation to the predetermined first point and the straight line.

According to this configuration, when estimating the parking section, the parking section can be easily estimated with high accuracy by using the bipartite graph and the cost matrix.

In the specific area detection device, for example, the detection unit may search for the combination of the first point and the second point with the minimum cost by applying a Hungarian method to the cost matrix.

According to this configuration, by applying the Hungarian method to the cost matrix, the parking section can be accurately estimated with a simple algorithm.

The specific area detection device may further include, for example, a display control unit configured to cause the specific area detected by the detection unit to be displayed on a display unit.

According to this configuration, parking assistance for a driver can be provided by displaying the detected parking section.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A specific area detection device that detects a specific area in an imaging area based on a captured image, the specific area detection device comprising:
a processor configured to implement
an estimation unit configured to estimate a plurality of points and directions of a straight line connecting two predetermined points among the plurality of points from the captured image using a learning model created by learning about a specific area defined by a predetermined number of the plurality of points in an imaging area using a previously captured image for learning; and
a detection unit configured to detect the specific area by classifying the plurality of points for each specific area based on one of the directions of the straight line connecting the two predetermined points,
wherein the specific area is a parking area and the directions of the straight line connecting the two predetermined points is different than a line demarcating the parking area in the captured image.

2. The specific area detection device according to claim 1, wherein
the estimation unit estimates the plurality of points and the directions of the straight line connecting the two predetermined points from a captured image using a second learning model created by learning about a quadrangular parking section defined by four corner points as the specific area, and
the detection unit detects the quadrangular parking section by classifying the plurality of points for the quadrangular parking section based on one of the directions.

3. The specific area detection device according to claim 2, further comprising:
a display control unit configured to cause the parking section detected by the detection unit to be displayed on a display unit.

4. A specific area detection device that detects a specific area in an imaging area based on a captured image, the specific area detection device comprising:
a processor configured to implement:
an estimation unit configured to estimate a plurality of points and a directions of a straight line connecting two predetermined points among the plurality of points from a captured image using a learning model created by learning about a specific area defined by a predetermined number of the points in an imaging area using a previously captured image for learning; and
a detection unit configured to detect the specific area by classifying the plurality of points for each specific area based on one of the directions of the straight line connecting the two predetermined points, wherein
the estimation unit estimates the plurality of points and the directions of the straight line connecting the two predetermined points from a captured image using a second learning model created by learning about a quadrangular parking section defined by four corner points as the specific area,
the detection unit detects the quadrangular parking section by classifying the plurality of points for the parking section based on one of the directions,
the estimation unit is configured to:
when estimating the plurality of points, estimate the plurality of points with each of the plurality of points classified into any of four kinds of points including a first point, a second point, a third point, and a fourth point in a predetermined rotation direction based on a direction of vehicle approach toward the parking section, and when estimating the directions of the straight line connecting the two predetermined points, estimate a directions of a straight line connecting the first point and the second point which are estimated to belong to a same a quadrangular parking section, and the detection unit is configured to classify the plurality of points for each parking section based on the directions by searching for a combination of the first point and the second point with a minimum cost using a cost matrix corresponding to a bipartite graph of a plurality of the first points and a plurality of the second points, and when a predetermined first point and a predetermined second point are selected, calculate a cost based on three points including the predetermined first point, the predetermined second point, and an intersection point of a perpendicular line drawn from the predetermined second point with respect to the straight line connecting the first point and the second point indicating the directions estimated in relation to the predetermined first point and the straight line.

5. The specific area detection device according to claim 4, wherein the detection unit searches for the combination of the first point and the second point with the minimum cost by applying a Hungarian method to the cost matrix.

\* \* \* \* \*